UNSYMMETRICAL ELECTROMECHANICAL FILTERS

Filed Oct. 7, 1965

INVENTORS
ERICH TRZEBA
HANHERMANN RUDLOFF
HORST DELIGA

BY Nolte and Nolte
ATTORNEYS

United States Patent Office 3,389,351

Patented June 18, 1968

3,389,351
UNSYMMETRICAL ELECTROMECHANICAL FILTERS

Erich Trzeba, Dresden, and Hans Hermann Rudloff and Horst Deliga, Kleinmachnow, Germany, assignors to VEB Werk für Bauelemente der Nachrichtentechnik "Carl von Ossietzky," Teltow, Germany Filed Oct. 7, 1965, Ser. No. 493,708
1 Claim. (Cl. 333—71)

ABSTRACT OF THE DISCLOSURE

Mechanical band-pass filter comprising mechanical resonators interconnected by mechanical couplings, the diameters of said couplings and/or resonators having different magnitudes and being unsymmetrically stepped with respect to the geometric center of the filter. The impedances of electromechanical transformers on the terminal elements of the filter have unequal values.

This invention relates in general to mechanical frequency filters, and in particular to mechanical band-pass filters for selecting electrical and especially high frequency oscillations.

For selecting high frequency oscillations, generally electrical filters are used which essentially consist of coils and capacitors. These electrical filters have the disadvantage in certain applications that the desired attenuation curve will not be attained due to the high losses in the coils and capacitors.

It is known that by using mechanical tunable structures in mechanical band-pass filters, a technically more favorable attenuation may be attained in contrast to the above described filters which consist of electrical switching elements.

Mechanical band-pass filters are known comprising mechanical resonant bodies in which the resonance and coupling elements are excited by compression, torsion and bending oscillations, and form a mechanical conduit. The length of the resonance bodies which are tuned to the center frequency of the band width equals generally one half of the wave length of the compression, torsion or bending oscillations. This length depends on the material of the resonant body.

Band-pass filters of the type wherein the resonant body consists of a large number of axially aligned resonators and coupling elements having equal or symmetrically stepped diameters with respect to the central point of the resonant body, form an unsually long structure, are difficult to manufacture and require too much space.

Mechanical band-pass filters are also known which consist of a plurality of resonance bodies which are energized by torsion oscillation, these resonance bodies are arranged axially parallel to each other and are connected with each other by longitudinally energized coupling links.

The disadvantage of the latter arrangement is based on the fact that it is technologically difficult to make by-pass couplings, since the by-pass coupling which actuates its corresponding coupling links has to be led across resonators with uniform diameter without touching these resonators. The dimensioning of mechanical band-pass filters is generally based on the assumption that the resonant system is lossless.

The neglect of mechanical losses leads to errors which are not negligible when using high quality band-pass filters. These errors are especially represented by a too large ripple of the attenuation in the band width, and a too small steepness of the attenuation curve at the band edges. This in turn results in a reduction of the useful band width.

It is an object of the invention to provide improved mechanical band-pass filters which have high quality transmission characteristics, consequently, extending the sphere of their utilization, especially for areas in the field of communications.

It is another object of the invention to reduce as much as possible the deviations from the desired values present in known mechanical band pass filters or to completely eliminate such deviations and to obtain a high steepness of the attenuation curve at the edges of the band width.

According to the invention, mechanical band pass filter consisting of mechanical resonant elements which are interconnected by means of mechanical coupling elements is so arranged that, the coupling coefficients which are disposed symmetrically around the geometrical center of the band-pass filters are unsymmetrically stepped in their respective magnitude between the individual resonators. The coupling coefficients are calculated from certain formulae which are in agreement with known theories of filter design and under strict consideration of the resonator losses, will have the following form for the simple case of $\nu/4$ compression resonators:

$$k_{\mu\cdot\nu}=\frac{2}{\pi}\cdot\frac{d_k{}^2}{\sqrt{d^2{}_\mu\cdot d_\nu{}^2}}$$

where $k_{\mu;\,\nu}$ is the coupling coefficient between vibrator $\mu$ and vibrator $\nu$, $d_k$ is the diameter of the coupling vibrator, and $d_\mu$ or $d_\nu$ is the diameter of resonators $\mu$ or $\nu$. When the resonators are made of the same material, the attenuations of the individual resonators are alike.

The result is that, the terminal impedances of the band pass filter which are introduced into the network for an additional attenuation are also unsymmetric.

From the stated equation, follows the concept of the invention stating that besides the unsymmetric dimensioning of the terminal impedance of the band pass filter at least the diameters of the coupling elements $d_k$ of the band-pass filters or at least the diameters of the resonators or couplings should be unsymmetrically arranged in order to obtain the specified frequency relations.

The technical and economical effects of the invention reside in the improvement of the transmission characteristics of mechanical band-pass filters and therefore a wider range of utilization opens up in the field of electronics and communications.

The various features of novelty which characterize the invention are pointed out with particularity in the claim annexed to and forming a part of this specification. For a better understanding of the invention, its operating advantages and the specific objects attained by its use, reference should be had in the accompanying drawings and descriptive matter in which:

Figure 1:
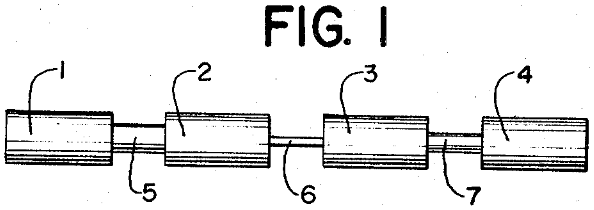
FIG. 1 shows a resonator chain according to this invention.

FIG. 1 shows a mechanical resonator chain consisting of cylindrical resonators 1, 2, 3 and 4, which are connected to each other by means of cylindrical coupling elements 5, 6 and 7. The resonator chain is energized to produce compressive oscillation. The diameters of the coupling elements 5, 6 and 7 deviate from each other and with respect to the diameter of the coupling element 6 in the geometric center of the resonant body show unsymmetrically stepped magnitudes.

Figures 2, 3:
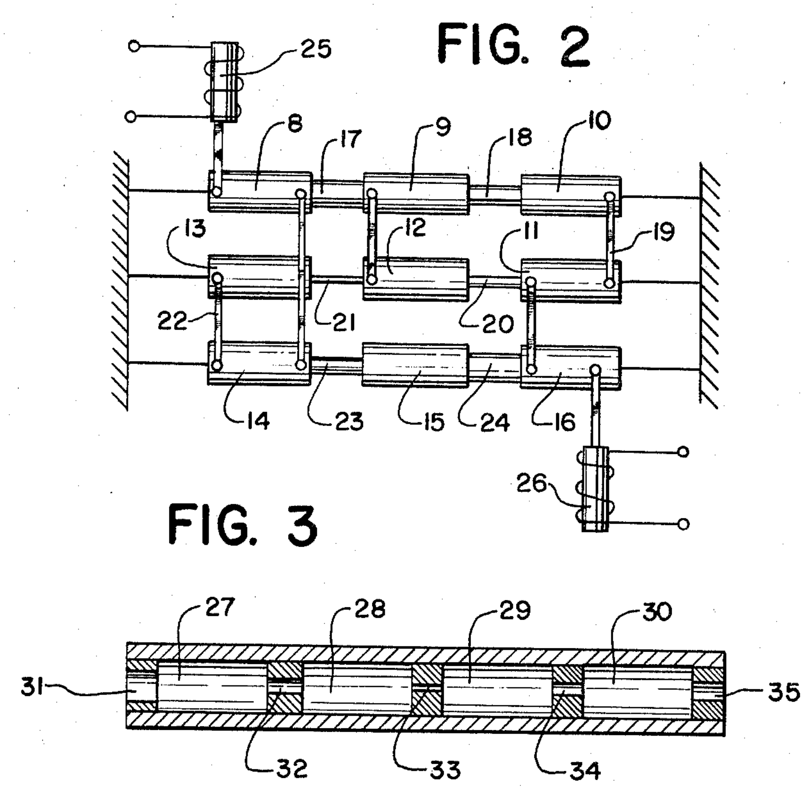
FIG. 2 shows band-pass filter with a plurality of axially parallel arranged resonator chains.
FIG. 3 shows a resonator chain for low frequencies.

In FIG. 2, it can be seen that the band-pass filter comprises a plurality of resonators 8, 9, 10, 11, 12, 13, 14, 15 and 16, which are arranged axially and parallel with respect to each other. These resonators are energized to produce torsional oscillations. The coupling coefficients between resonators 8, 9, 10, 11, 12, 13, 14, 15 and 16 is defined by the different diameters of the respective coupling elements 17, 18, 19, 20, 21, 22, 23 and 24, and the diameters are unsymmetrically stepped in their magnitude with respect to the geometric center of the band pass filter. The distance of the point of engagement of coupling elements 19 or 22 from the front face of resonators 10 and 11, resp. 13 and 14, may be used to calculate the coupling coefficient between resonators 10 and 11, resp. 13 and 14. Transducers 25 and 26 are coupled at the terminal resonators 8 and 16, respectively, of the band pass filter, to transform different attenuation values in the resonators 8 and 16.

FIG. 3 shows a resonator chain 4 in which the resonators are formed as cavities 27, 28, 29 and 30 for obtaining low frequencies in which the diameters of the connecting channels 31, 32, 33, 34 and 35 have unsymmetrically stepped magnitudes with respect to the diameter of the geometric center of the band pass filter.

Figure 4:
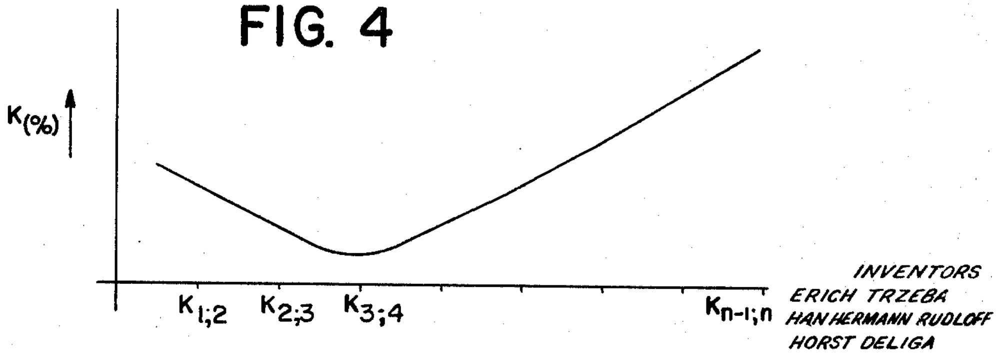
FIG. 4 is a graphic showing of the relative coupling deviations of consecutive elements in a resonator chain.

FIG. 4 shows percentually the deviation of magnitudes K (percent) of the coupling coefficients as a function of the number $K_{n-1;\,n}$ of coupling coefficients of band pass filter according to the present invention.

It is to be understood that the embodiments herein are shown merely for illustrative purposes and that the invention is not to be limited to these embodiments alone, but rather by the claim appended below.

What is claimed is:

1. A mechanical band-pass filter system for selecting electrical oscillations with a minimum ripple of the band pass characteristic, comprising:

a plurality of support means;

a first cylindrical resonator element (8) having a first longitudinal axis and secured to a first of said support means, said first resonator element (8) connected to first transducer means (25) having leads;

a first cylindrical coupling element (17) having a first diameter and operatively connected to said first resonator element (8);

a second cylindrical resonator element (9) having a longitudinal axis coincident with said first axis, said second resonator element (9) connected to said first coupling element (17);

a second cylindrical coupling element (18) having a second diameter and operatively connected to said second resonator element (9);

a third cylindrical resonator element (10) having a longitudinal axis coincident with said first axis, said third resonator element (10) connected to said second coupling element (18) and a second of said support means;

a fourth cylindrical resonator element (11) having a second longitudinal axis substantially parallel with respect to said first longitudinal axis, said fourth resonator element coupled to said third resonator element with a transverse coupling element (19) and further secured to a third of said support means;

a third cylindrical coupling element (20) having a third diameter and operatively connected to said fourth resonator element (11);

a fifth cylindrical resonator element (12) having a longitudinal axis coincident with said second axis, said fifth resonator element (12) connected to said third coupling element (20), said fifth resonator element coupled transversely to said second resonator element;

a fourth cylindrical coupling element (21) having a fourth diameter and operatively connected to said fifth resonator element (12);

a sixth cylindrical resonator element (13) having a longitudinal axis coincident with said second axis and secured to a fourth of said support means, said sixth resonator element (13) connected to said fourth coupling element (21);

a seventh cylindrical resonator element (14) secured to a fifth of said support means and coupled transversely to both said sixth resonator element (13) and said first resonator element (8), said seventh resonator element (14) having a third longitudinal axis;

a fifth cylindrical coupling element (23) having a fifth diameter and operatively connected to said seventh resonator element (14);

an eighth cylindrical resonator element (15) having a longitudinal axis coincident with said third axis, said eighth resonator element (15) connected to said fifth coupling element (23);

a sixth coupling element (24) having a sixth diameter and operatively connected to said eighth resonator element (15);

and a ninth cylindrical resonator element (16) having a longitudinal axis coincident with said third axis, said ninth resonator element transversely coupled to said fourth resonator element (11) and secured to a sixth of said support means, said ninth resonator element (16) further coupled to second transducer means (26) having leads, said first and second transducer means (25, 26) each having different respective impedances from one another, the ratio of said diameters of said coupling elements being unsymmetrically stepped from a center of the filter system to produce predetermined coupling factors.

References Cited

UNITED STATES PATENTS

| | | | |
|---|---|---|---|
| 2,617,882 | 11/1952 | Roberts | 333—71 |
| 2,856,588 | 10/1958 | Burns | 333—71 |
| 2,918,634 | 12/1959 | Bercovitz | 333—71 |
| 3,013,228 | 12/1961 | Kettel et al. | 333—71 |

FOREIGN PATENTS

| | | |
|---|---|---|
| 1,147,335 | 4/1963 | Germany. |
| 1,358,314 | 3/1964 | France. |

ROY LAKE, *Primary Examiner.*

DARWIN R. HOSTETTER, *Examiner.*